May 17, 1949.  N. LINDGREN ET AL  2,470,176
SURFACE COMPARISON MICROSCOPE HAVING LIGHT
CONDUCTING MEMBERS PROVIDING GRAZING
AND DIFFUSE ILLUMINATION
Filed March 18, 1946   3 Sheets-Sheet 1
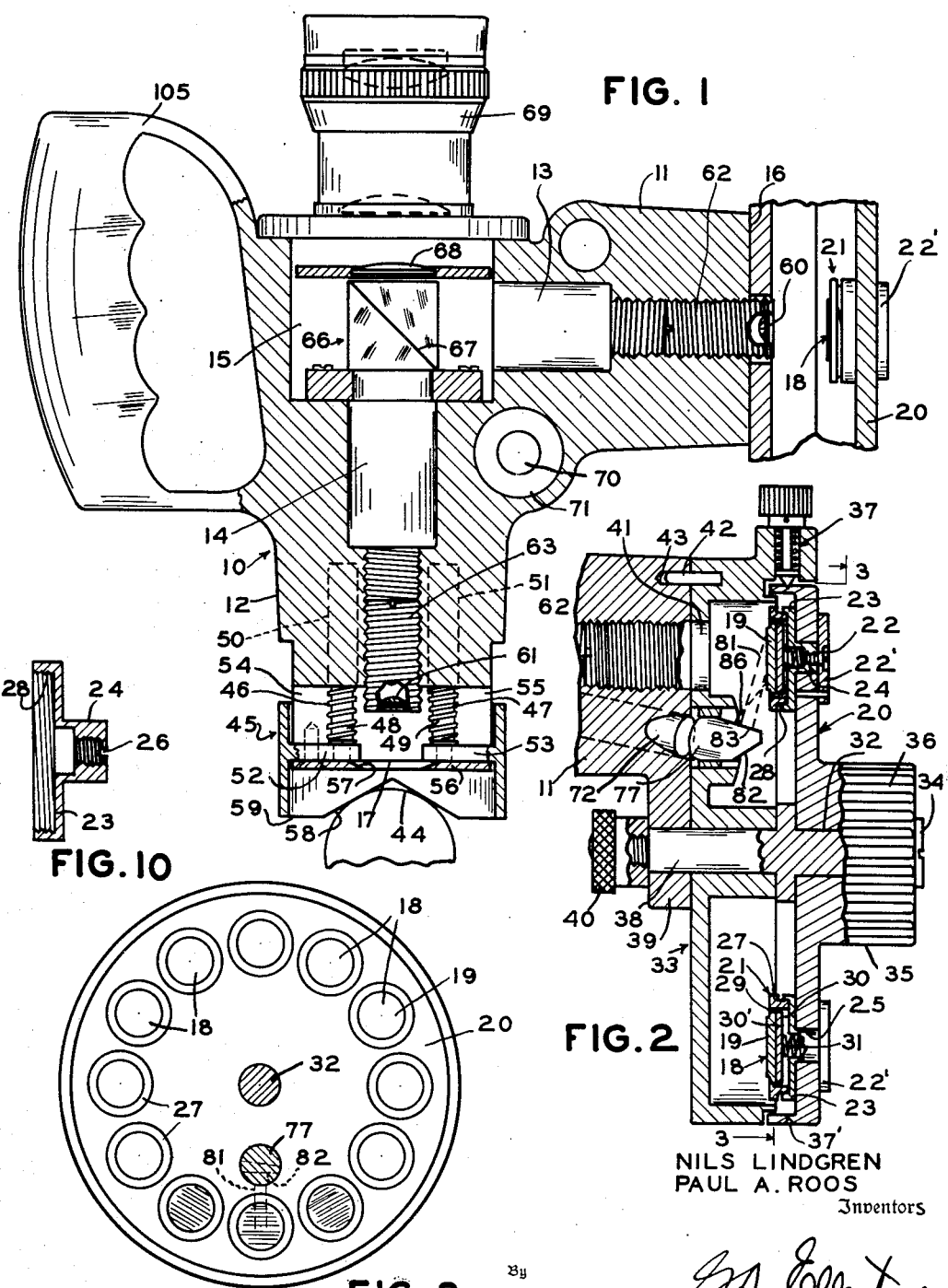
NILS LINDGREN
PAUL A. ROOS
Inventors May 17, 1949.  N. LINDGREN ET AL  2,470,176
SURFACE COMPARISON MICROSCOPE HAVING LIGHT
CONDUCTING MEMBERS PROVIDING GRAZING
AND DIFFUSE ILLUMINATION
Filed March 18, 1946  3 Sheets-Sheet 2
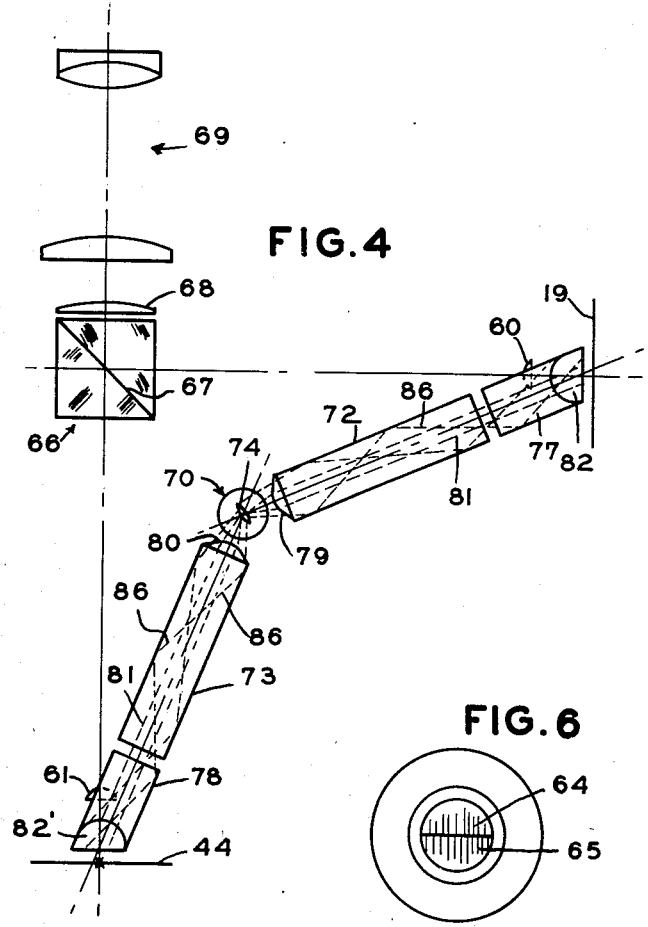
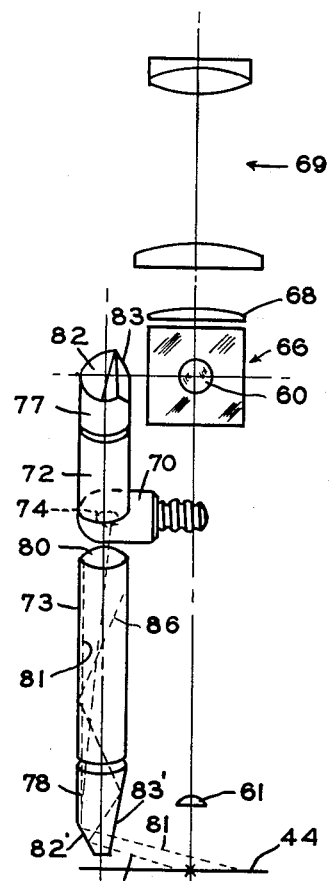
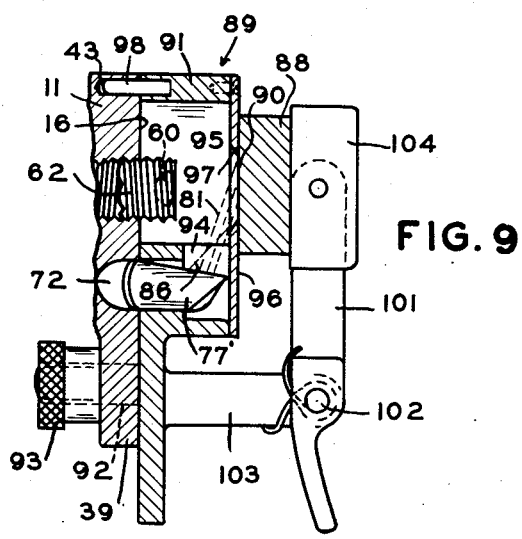
NILS LINDGREN
PAUL A. ROOS
Inventors
Attorney May 17, 1949.  N. LINDGREN ET AL  2,470,176
SURFACE COMPARISON MICROSCOPE HAVING LIGHT
CONDUCTING MEMBERS PROVIDING GRAZING
AND DIFFUSE ILLUMINATION
Filed March 18, 1946  3 Sheets—Sheet 3
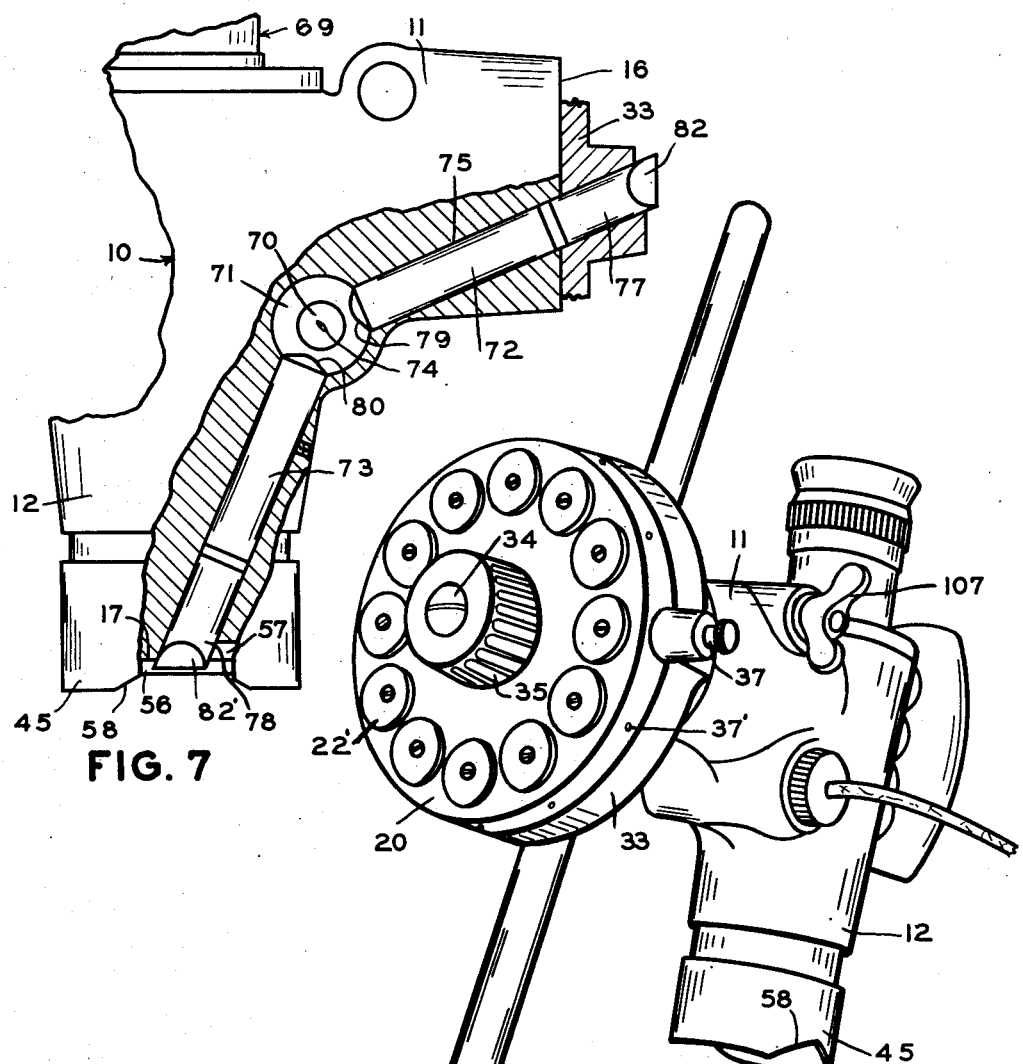
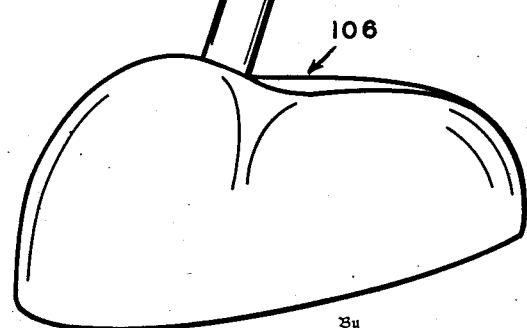
NILS LINDGREN
PAUL A. ROOS
Inventors
Attorney Patented May 17, 1949

2,470,176

UNITED STATES PATENT OFFICE 2,470,176

SURFACE COMPARISON MICROSCOPE HAVING LIGHT CONDUCTING MEMBERS PROVIDING GRAZING AND DIFFUSE ILLUMINATION

Nils Lindgren, Irondequoit, and Paul A. Roos, Greece, N. Y., assignors to Bausch & Lomb Optical Company, Rochester, N. Y., a corporation of New York Application March 18, 1946, Serial No. 655,094

4 Claims. (Cl. 88—14)

1

The present invention relates to a surface comparison microscope of the type in which the images of standard and specimen surfaces are adjacently formed in a single field.

It is an object of the present invention to provide a novel surface comparison microscope of the above type which is light and easy to handle while being compact and sturdy.

It is a further object to provide a device in which the surfaces under comparison are equally illuminated by a single light source.

It is another object to provide such a device wherein principal illuminating beams of substantially parallel light rays fall upon the surfaces under comparison at grazing incidence and wherein diffused light rays additionally illuminate the surfaces in the proximity of said beams.

A still further object is to provide such a device in which the illuminating light rays are conducted through transparent, refractive light conducting members for transmission of both the principal and the auxiliary diffused light rays.

It is a further object to provide such a device with interchangeable and removable holders which are adapted to retain either a single or a plurality of standard surfaces in viewing position.

It is another object to provide such a device in which the light conductors are composed of multiple sections and the standard surface holder receives one of such sections fixedly in a position to direct and intensify the beam in close proximity to the standard surface.

Further objects and advantages will be apparent to those skilled in the art by reference to the following description and accompanying drawings in which:

Fig. 1 is a side elevation partly in section of a preferred embodiment of the invention, Fig. 2 is a longitudinal section of the holder for a plurality of standard surfaces, Fig. 3 is a cross section taken on line 3—3 of Fig. 2, Fig. 4 is a diagrammatic side elevation of the optical parts, Fig. 5 is an end elevation of the optical parts shown in Fig. 4, Fig. 6 shows the view in the eyepiece, Fig. 7 is a fragmentary side elevation partly in section of the casing and illuminating means, Fig. 8 is a perspective view of the invention assembled on a stand, Fig. 9 is a longitudinal section of a modification of the invention for holding a single standard surface, and

2

Fig. 10 is a sectional view taken along the axis of a chuck member for holding the standard surfaces.

In Fig. 1 of the drawings, a body member or casing generally indicated at 10 having the angular extensions 11 and 12 is provided throughout the length of each extension with coplanar passages 13 and 14 which terminate inwardly in an open chamber 15. The outer ends of passages 13 and 14 terminate in faces 16 and 17 respectively which are normal to the axes thereof.

Means for holding a plurality of blocks 18 having different standard or master surfaces 19 thereon in viewing position across the outer end of passage 13 is provided in the form of a rotatable disk 20 on which clamping chucks 21 are secured by any suitable means such as screws 22 and washers 22'. The body 23 of the clamping chuck is positioned on the disk 20 by the shank 24 which closely but releasably fits into holes 25 in the disk. Means for arranging the surface markings of the standard surface 19 in a predetermined manner with relation to an illuminating beam therefor and in an optical field is provided in the form of a cross slot 26, as shown in Fig. 10, in which an instrument blade may be inserted to rotate the chuck 21 after block 18 has been chucked therein. A clamping ring 27 threaded to the chuck 21 by threads 28 is provided with a tapered lip 29 which overhangs the edge of the standard surface 19 to retain it in a fixed position. The lip 29 insures that the standard surface 19 is held accurately normal to the axis of the optical system regardless of the lack of uniformity in thickness or parallelism of the front and back surfaces of the master block, the variation being taken care of by a clearance space 30. The block 18 rests against a pressure plate 30' and is pressed against the clamping ring 27 to bring the surface 19 into an established object plane by a compression spring 31 seated in the body 23 of the chuck. It will be seen, as shown in Fig. 3, that the surface markings on the master surfaces 19 are all oriented in a standard manner in the clamping chucks 21 for advantageous reasons which appear later in this description.

Rotatable disk 20 is journaled upon a spindle 32 projecting from a stationary casing 33 and is held thereon by a cap screw 34. A cylindrical extension 35 on disk 20, having a corrugated peripheral surface 36, enables the operator to index the disk 20 to align any selected master surface 19 across the passage 13 and the rotatable disk is retained in this position by a spring detent 37 cooperating with depressions 37' spaced around the periphery of the disk. Spindle 32 is extended beyond the rear of casing 33 to act as a mounting stud 38 for attaching the rotary member 20 and casing 33 to the body ear 39, the members 20 and 33 being held thereon by thumb nut 40. Casing 33 is also provided with an opening 41 in axial alignment with the body passage 13 so that any master surface 19 may be aligned therewith.

A dowel pin 42, fixed in the casing 33 and slidably received in an opening 43 of body extension 11, further assists in aligning the passage 13 with opening 41.

Means for locating and holding a specimen surface 44 in correct viewing position at the outer end of the body passage 14 is provided in the form of a cylindrical slidable locator 45 yieldably mounted by suitable means such as springs 46 and 47 on the end of body extension 12. Locator 45 is prevented from rotating by a pair of slidable rods 48 and 49 closely fitting the bores 50 and 51 in body extension 12, said rods being fixed to the integral interior ears 52 and 53 on locator 45 which fit freely within slots 54 and 55 cut across the end of body extension 12. The ears 52 and 53 are prevented from moving out of slots 54 and 55 by a fixed retainer plate 56 mounted across the slots against face 17 within the locator 45 and having an inwardly bevelled port 57 therethrough in alignment with the objective lens 61. Means for arranging the surface markings of circular or angular specimen surfaces 44 with reference to the surface markings of the standard surface 19 are provided in the form of recesses of any suitable shape such as the V 58 which are formed transversely across the outer rim 59 of the locator 45. The outer surface of the plate 56 is located in the object plane of lens 61 so that the specimen surface may be located properly by placing it against plate 56.

Optical means for forming enlarged images of the master or standard surface 19 and the specimen surface 44 is provided in the form of objective lenses 60 and 61 adjustably mounted by means of threads 62 and 63 in passages 13 and 14 in the body extensions 11 and 12, respectively, and having the object planes thereof coincident with the master and specimen surfaces. The images formed by the objective lenses 60 and 61 are united along a dividing line 64 in a single field 65, Fig. 6, by a compound prism 66 which is fixed within chamber 15 and has the portion 67 of its interface below the intersection of the optical axes coated with an opaque layer to reflect half of the rays transmitted by the objective lens 60 while obstructing half of the rays transmitted by the objective lens 61 in the well-known manner. Means for viewing the composite field 65 thus formed by the objective lenses is afforded by placing a collective lens 68 and an ocular 69 on the optical axis of the objective 61.

According to the present invention, means are provided for substantially equally illuminating the standard and specimen surfaces at grazing incidence comprising a single light source such as the electric lamp 70 centrally mounted in a cylindrical chamber 71 which is equidistant from both the master and specimen surfaces 19 and 44, and a plurality of light conductors 72 and 73 in axial alignment with the filament 74 of lamp 70. The lamp 70 may, if desired, be longitudinally and rotatably adjustable for proper alignment of the filament 74 relative to the axes of the light conductors 72 and 73 and may be energized from any suitable electrical source of power, not shown.

The light conductors 72 and 73, formed of glass or other transparent material such as acrylic resins, are aligned to cooperate, respectively, with the outer light-conducting members 77 and 78 which are formed of a similar transparent, light-conducting material. The ends of the conductors 72 and 73 which are adjacent the lamp 70 are preferably formed with integral hyperboloidal lens surfaces 79 and 80, respectively, so that light rays from the lamp 70 will be transmitted in a substantially parallel beam, indicated at 81, axially of the members 72 and 73 and into the members 77 and 78. The ends of the members 77 and 78, which are respectively adjacent the surfaces 19 and 44, are formed with the polished angularly disposed surfaces 82, 83 and 82', 83' so as to direct the beams of parallel rays 81 onto the respective surfaces 19 and 44 at grazing incidence.

In addition to directing beams of collimated rays onto the surfaces at grazing incidence, the light conducting members also function to direct scattered or diffused light rays 86 onto the surfaces 19 and 44 at random angles so as to illuminate the valleys or depressions of the surfaces and thereby enable the observer to determine more accurately the depths of the valleys or depressions. While the collimated parallel beams 81 are directed substantially parallel to the axes of the conducting members, the scattered or diffused light rays are directed along the conducting members by internal reflection on the side walls thereof as indicated at 86. The conducting member 77 is fixedly mounted in a bore in casing 33 so that when the latter is secured to the body extension 11, the member 77 will be held in operative relation to the member 72.

In Fig. 9 of the drawings, a modification of the invention is illustrated in which a single block 88 having a standard surface 90 thereon is firmly held in the object plane of the objective lens 60 and against the body face 16 by a separable adapter clamp 89. The clamp has a base 91 which fits against the body face 16 and is removably attached thereto by any suitable means such as the stud 92 traversing the body ear 39 and the thumb screw 93. Light conducting member 77' is fixed in the base 91 in an angular position similar to the position of member 77 in the casing 33 of the disk type holder 20 so as to reflect the light beam 81 onto the master surface 19 at grazing incidence through a port 94 into a light chamber 95. Chamber 95 is closed at one side by a locating plate 96 having a flared opening 97 in axial alignment with objective lens 60, the outer surface of the plate 96 being in the object plane of the lens 60 so as to correctly position the standard surface block 88. Proper alignment of the objective lens 60 and flared opening 97 is secured by setting a dowel pin 98 solidly in the base 91 so as to slidably enter the hole 43 in the body extension 11. A spring finger 101 pivoted at 102 on the post 103 and having an inclinable pressure pad 104 thereon, presses the master block 88 firmly against the working surface of plate 96.

In order to improve the portability and handling of the instrument in use, a convenient handle 105 is added to the body 10. The instrument may also be detachably secured to a stand 106 by suitable clamping means indicated generally at 107.

In use, the surface comparison microscope may be held manually in contact with the specimen surface 44 or may be mounted on the stand 106 in which case the specimen surface 44 is brought into contact with the locator 45. In either case a master surface 19 of selected surface characteristics is arranged over the passage 13 either by indexing the disk 20 of by placing a master block 88 in the clamp 89. In case the disk 20 is used to hold the standard surface, the surface markings on the block 18 are arranged to lie substantially at right angles to the direction of the incident beam 81 by inserting a blade in the slot 26 of the chuck 21 and rotating it until the surface markings appear to erectly meet the dividing line 64 in the field 65. The light 70 is turned on and the specimen surface 44 is pressed against the locator 45. When a specimen surface 44 of round or angular cross section is examined, the surface markings are properly aligned in the field 65 by placing the specimen in the recess 58. If the specimen under comparison is flat or substantially so, the specimen surface is brought into focus of the lens 61 by pressing it against the plate 56 and turning the specimen until the surface markings, appearing in the field 65, are aligned in a colinear manner. The observer may then examine the surfaces under comparison and manipulate either of the surfaces to aid in judging the surface finish.

Although but certain forms of the invention have been shown and described in detail, it will be understood that other forms are possible and changes may be made in the form and arrangement of the parts without departing from the spirit of the invention as defined in the appended claims.

We claim:

1. In a surface comparison microscope, a body member having passages extending therethrough and a chamber connecting said passages, a locating member for holding a specimen surface in juxtaposition to one of said passages, a separable adapter member for holding a standard surface in juxtaposition to another of said passages, optical means within said chamber and passages for forming enlarged adjacent images of said surfaces in a field, and illuminating means for said surfaces comprising a single light source and a plurality of pairs of aligned light conducting members, one of the pairs having an outermost member thereof held within said separable adapter member to direct light rays onto the standard surface, said conductors having refracting and reflecting means in optical alignment therewith for directing from said source a beam of substantially parallel light rays at grazing incidence upon said surfaces and additionally providing from said source an illumination of diffused light rays on the surfaces.

2. A surface comparison microscope comprising a body having two hollow extensions angularly disposed to each other, means for holding a specimen surface against the open end of one extension and a part detachably secured to the body for holding a standard surface against the open end of the other extension, means within the body and extensions for forming in a field adjacent images of the respective surfaces, and means for equally illuminating said surfaces comprising a single light source mounted within a recess in the body and a pair of aligned substantially cylindrical transparent members mounted within a bore intersecting said recess and in optical alignment with said source and specimen surface, a second pair of substantially cylindrical transparent members in optical alignment with said source and standard surface, the member of the second pair which is adjacent the source being mounted in a bore in the body, the other member of the second pair being mounted within said part adjacent the standard surface.

3. In a microscope having means for holding a surface and means for forming an image of the surface, the combination of means for illuminating the surface by directing substantially parallel light rays onto the surface at grazing incidence and additionally illuminating the surface by diffused light rays, said last named means comprising a light source having a filament, lens means positioned adjacent the source with the focal point of the lens means located at the filament, and transparent rod means extending from the lens means to a point adjacent the surface, the axes of the lens means and rod means being substantially coincident, the rod means having an angular reflecting face adjacent the surface at such an angle as to provide grazing incidence of light rays on the surface whereby light rays from one point on the filament will be collimated by the lens means and transmitted through the rod means while light rays from other points on the filament will be directed onto the side walls of the rod means and successively reflected thereby to provide additional diffuse illumination on the surfaces.

4. A surface comparison microscope comprising a body having two hollow extensions disposed at substantially right angles to each other, means for respectively holding specimen and standard surfaces against the open ends of the extension, means within the body and extensions for forming in a field adjacent images of the two surfaces, and means having substantially identical optical paths for equally illuminating said surfaces comprising a single light source mounted within a recess in the body and two substantially similar pairs of aligned cylindrical transparent members mounted within bores in the body in alignment with the source, the ends of the members adjacent the source being formed with lens surfaces, the ends of the members adjacent the surfaces having angular reflecting faces whereby light rays from the source are directed in collimated beams through the members and thence reflected by the reflecting faces at grazing incidence onto the surfaces while other light rays from the source are internally reflected by the walls of the members and pass through the members to diffusely illuminate the surfaces.

NILS LINDGREN.
PAUL A. ROOS.

REFERENCES CITED

The following references are of record in the file of this patent:

UNITED STATES PATENTS

| Number | Name | Date |
|---|---|---|
| 1,873,149 | Perez | Aug. 23, 1932 |
| 1,976,270 | Urfer | Oct. 9, 1934 |
| 2,065,059 | De Lima | Dec. 22, 1936 |
| 2,184,750 | Meinhardt et al. | Dec. 26, 1939 |
| 2,214,595 | Rights | Sept. 10, 1940 |
| 2,221,152 | Rylsky | Nov. 12, 1940 |
| 2,286,430 | Minton et al. | June 12, 1942 |